US011987066B2

(12) United States Patent
Callegari et al.

(10) Patent No.: US 11,987,066 B2
(45) Date of Patent: May 21, 2024

(54) OPTICAL SECURITY ELEMENTS, MARKED OBJECT, METHOD OF AUTHENTICATING AN OBJECT AND USE OF OPTICAL SECURITY ELEMENTS FOR AUTHENTICATING OR SECURING AGAINST COUNTERFEITING

(71) Applicant: SICPA HOLDING SA, Prilly (CH)

(72) Inventors: Andrea Callegari, Chavannes-près-Renens (CH); Pierre Degott, Mollie-Margot (CH); Todor Dinoev, Chavannes-près-Renens (CH); Philipp Egger, Crissier (CH)

(73) Assignee: SICPA HOLDING SA, Prilly (CH)

( * ) Notice: Subject to any disclaimer, the term of this patent is extended or adjusted under 35 U.S.C. 154(b) by 518 days.

(21) Appl. No.: 17/282,959

(22) PCT Filed: Oct. 4, 2019

(86) PCT No.: PCT/EP2019/076943
§ 371 (c)(1),
(2) Date: Apr. 5, 2021

(87) PCT Pub. No.: WO2020/070299
PCT Pub. Date: Apr. 9, 2020

(65) Prior Publication Data
US 2021/0370703 A1 Dec. 2, 2021

(30) Foreign Application Priority Data
Oct. 5, 2018 (EP) .................................... 18198945

(51) Int. Cl.
*B42D 25/00* (2014.01)
*B42D 25/21* (2014.01)
(Continued)

(52) U.S. Cl.
CPC ........... *B42D 25/324* (2014.10); *B42D 25/21* (2014.10); *B42D 25/29* (2014.10); *G07D 7/12* (2013.01); *G07D 2207/00* (2013.01)

(58) Field of Classification Search
CPC ...... G02B 5/124; G02B 5/136; B42D 25/324; B24D 25/351; G07D 7/12
See application file for complete search history.

(56) References Cited

U.S. PATENT DOCUMENTS

2007/0223095 A1 9/2007 Brown
2008/0160226 A1 * 7/2008 Kaule .................. B42D 25/328 428/29
(Continued)

FOREIGN PATENT DOCUMENTS

AU 2011101251 A4 11/2011
CN 104582978 4/2015
(Continued)

OTHER PUBLICATIONS

Japan Patent Office Action in counterpart Japanese Application No. JP2021-518555 dated 13-Jun. 2023 (and English language translation of Office Action).
(Continued)

*Primary Examiner* — Rebecca C Bryant
(74) *Attorney, Agent, or Firm* — Muncy, Geissler, Olds & Lowe, P.C.

(57) ABSTRACT

An optical security element made of a refractive transparent or partially transparent optical material and comprising an optical assembly of a caustic layer having a light-redirecting surface with a relief pattern of given depth and a focal length $f_C$ and an adjacent lens element of focal length $f_L$ configured to redirect incident light received from a point-like light source through it and to form a projected image containing a caustic pattern directly on a retina of an observer. A marked object, as well as a method of visually authenticating an object, and use of optical security elements for authenticating or securing against counterfeiting are also disclosed.

9 Claims, 10 Drawing Sheets

(51) Int. Cl.

| | |
|---|---|
| ***B42D 25/324*** | (2014.01) |
| *B42D 25/29* | (2014.01) |
| *G07D 7/12* | (2016.01) |

(56) References Cited

U.S. PATENT DOCUMENTS

| | | | |
|---|---|---|---|
| 2011/0157539 | A1 | 6/2011 | Rosset |
| 2013/0066596 | A1 | 3/2013 | Papas et al. |
| 2015/0070350 | A1 | 3/2015 | Cape et al. |
| 2016/0110638 | A1 | 4/2016 | Gregarek et al. |
| 2017/0139204 | A1 | 5/2017 | Pauly et al. |
| 2017/0255020 | A1 | 9/2017 | Tam et al. |
| 2019/0010364 | A1 | 1/2019 | Hähnel et al. |

FOREIGN PATENT DOCUMENTS

| | | | |
|---|---|---|---|
| CN | 105228836 | | 1/2016 |
| CN | 108473828 | | 8/2018 |
| DE | 10108637 | A1 | 9/2001 |
| EP | 2963463 | A1 | 1/2016 |
| JP | 2008529851 | | 8/2008 |

OTHER PUBLICATIONS

Notification of the First Office Action issued in counterpart Chinese Application No. 201980065390.1 dated Apr. 21, 2022 (and English language of the Office Action).

Guardiantm "Security Features Reference Guide", edition 2, May 2013, 44 pages.

International Search Report and Written Opinion of the International Searching Authority with respect to Application No. PCT/EP2019/076943.

* cited by examiner

OPTICAL SECURITY ELEMENTS, MARKED OBJECT, METHOD OF AUTHENTICATING AN OBJECT AND USE OF OPTICAL SECURITY ELEMENTS FOR AUTHENTICATING OR SECURING AGAINST COUNTERFEITING

TECHNICAL FIELD

The present invention relates to the technical field of refractive or reflective optical security elements operable to project caustic patterns upon appropriate illumination, as well as a method and use of such optical security elements for authenticating or securing against counterfeiting.

BACKGROUND ART

There is a need for security features on objects, that can be authenticated by the so-called “person in the street”, using commonly available means. These means include using the five senses—mostly, sight and touch—plus using widespread tools, such as for example a mobile phone.

Some common examples of security features are forensic fibers, threads or foils (incorporated into a substrate like paper for example), watermarks, intaglio printing or micro-printing (possibly printed on a substrate with optically variable inks) which can be found on banknotes, credit cards, ID’s, tickets, certificates, documents, passports etc. These security features can include optically variable inks, invisible inks or luminescent inks (fluorescing or phosphorescing under appropriate illumination with specific excitation light), holograms, and/or tactile features. A main aspect of a security feature is that it has some physical property (optical effect, magnetic effect, material structure or chemical composition) that is very difficult to counterfeit so that an object marked with such a security feature may be reliably considered as genuine if the property can be observed or revealed (visually or by means of a specific apparatus).

However, when the object is transparent, or partially transparent, overt, general public features may not be appropriate. In fact, transparent objects often require that the security element having the required security features does not change their transparency or their appearance, either for aesthetic or for functional reasons. Notable examples may include blisters and vials for pharmaceutical products. Recently, for example, polymer and hybrid banknotes have incorporated in their design a transparent window, thus generating the desire for security features that are compatible with it.

Most existing security features of security elements for documents, banknotes, secured tickets, passports, etc. have not been specifically developed for transparent objects/areas and, as such, are not well-suited for such an application. Other features, for example, those obtained with invisible and fluorescent inks require specific excitation tools and/or detection tools, which may not be readily available for “the person in the street”.

Semi-transparent optically variable features (e.g. liquid crystal coatings, or latent images from surface structures) are known and can provide this kind of functionality. Unfortunately, the marking incorporating such security features generally must be observed against a dark/uniform background for the effect to be well visible.

Solutions for transparent banknote windows are described e.g. in the Guardian™ “Security Features Reference Guide”, edition 2, May 2013. Most of disclosed security features interfere with the window transparency. One of them (Eclipse®) does not. It is a diffractive device that reveals a hidden image when looking through the transparent window at a bright point light source.

Diffractive security features, such as Eclipse®, suffer from a number of drawbacks including a strong chromatic aberration, the need for a bright light source, and the presence of the zero-order diffraction (i.e. the residual light from the source) in the projected image.

Other known features are diffractive optical elements used in reflection mode, or in transmission mode to project a pattern on a screen, such as non-metalized surface holograms. A disadvantage with these features is that they show a very low contrast visual effect when viewed directly. Furthermore, when used in combination with a monochromatic light source to project a pattern, they typically require a laser to give a satisfactory result. Moreover, a quite precise relative spatial arrangement of the light source, the diffractive optical element and the observer’s eyes is required in order to provide a clearly visible optical effect.

Laser engraved micro-text and or micro-codes have been used for e.g. glass vials. However, they require expensive tools for their implementation, and a specific magnifying tool for their detection.

It is therefore an object of the invention to overcome the shortcomings of the prior art and to provide optical security elements made of a refractive transparent or partially transparent optical material or comprising a light-redirecting surface of a caustic layer, wherein the optical security elements can be easily authenticated visually by a person, using either no further means (i.e. with naked eye) or commonly and easily available means, e.g. a mere point-like light source like the sun, a street lamp, a flash lamp of a smartphone etc. (a light source is considered as “point-like” if its angular size is less or equal than 1°).

Another object of the invention is to provide an optical security element easy to manufacture in large numbers, or compatible with mass-production manufacturing processes. Moreover, illumination of the optical security element should also be possible with easily available means (e.g. a light source like an LED of a mobile phone, or the sun), and the conditions for good visual observation by a user (an observer) should not require a too strict relative spatial arrangement of the light source, the optical security element and the observer’s eyes.

In other words, handling by a user (an observer) when checking the presence of the security feature should be as simple as possible, and the solution should be compatible with the broadest range of utilization conditions.

Another object of the invention is to provide a marked object, which comprises the optical security element, which has security features that can be easily authenticated visually by a person, using either no further means (i.e. with naked eye) or commonly and easily available means (e.g. mere magnifying lens or a point-like source, e.g. a LED of a mobile phone).

It is a further object of this invention to provide an efficient method of visually authenticating an object, marked with the optical security element made of a refractive transparent or partially transparent optical material or comprising a reflective light-redirecting surface of a caustic layer.

It is a further object of this invention to provide an optical security element for use in authenticating or securing against counterfeiting.

SUMMARY OF THE INVENTION

According to one aspect, the present invention relates to an optical security element made of a refractive transparent or partially transparent optical material and comprising an optical assembly of a caustic layer having a light-redirecting surface with a relief pattern of given depth and a focal length $f_c$ and an adjacent lens element of focal length $f_L$ configured to redirect incident light received from a point-like light source through it and form a projected image containing a caustic pattern directly on a retina of an observer looking at the point-like source through the optical security element.

It should be also noted with respect to light propagation that alternatively, the order: source→caustic layer→lens can be reversed as: source→lens→caustic layer (a known equivalent in classical optics).

The optical security element does not change transparency of a transparent or partially transparent object or of a transparent window incorporated in the object. It also advantageously enables simple handling and good visual observation by a user (an observer) when checking the presence of the security feature and is compatible with mass-production manufacturing processes.

The transparent aspect of the refractive optical security element makes it particularly suitable for marking at least partially transparent substrates (e.g. glass or plastic bottles, bottle caps, watch glasses, jewellery, gems, etc.). Preferably, the refractive optical security element is transparent (or partially transparent) to the visible light (i.e. for light wavelengths from about 380 nm to about 740 nm).

The optical security element according to the present invention comprises one of the following:

a) the caustic layer has a positive focal length ($f_C>0$) and the lens element has a negative focal length ($f_L<0$), or b) the caustic layer has a negative focal length ($f_C<0$) and the lens element has a positive focal length ($f_L>0$).

Preferably, a relationship between the focal length of the lens element and the focal length of the caustic layer satisfies following equation:

$$R-\left(\frac{1}{f_L}+\frac{1}{f_C}-\frac{1}{d_s}\right)^{-1}\geq d_R,$$

where:

R is distance between the caustic layer and an eye of the observer;

$d_s$ is a distance between the point-like light source and the optical security element; and $d_R$ is a comfortable reading distance from the eye, which is at least 25 cm.

The positive focal length is chosen to be equal or greater than the absolute value of the negative focal length.

The negative focal length may range from −15 mm to −125 mm, and preferably from −30 mm to −50 mm.

For example, the caustic layer has the negative focal length $f_C$ ranging from −30 mm to −50 mm and is combined with the lens element having a corresponding positive focal length $f_L$ ranging from 30 mm to 50 mm, the lens element being a plano-convex lens.

The optical security element according to the invention is used for marking an object selected from the group comprising: consumer products, value documents and banknotes.

According to another aspect, the present invention relates to an optical security element comprising a reflective light-redirecting surface of an optical assembly formed by a caustic layer having a relief pattern of given depth and a focal length $f_C$ and an adjacent optical material layer of focal length $f_L$, said optical assembly being configured to redirect incident light received from a point-like light source and to form a projected image containing a caustic pattern directly on a retina of an observer.

According to the invention, the optical security element comprises one of the following:

a) the caustic layer has a positive focal length ($f_C>0$) and the optical material layer has a negative focal length ($f_L>0$), or b) the caustic layer has a negative focal length ($f_C<0$) and the lens element has a positive focal length ($f_L>0$).

Preferably, a relationship between the focal length of the optical material layer and the focal length of the caustic layer satisfies following equation:

$$R-\left(\frac{1}{f_L}+\frac{1}{f_C}-\frac{1}{d_s}\right)^{-1}\geq d_R,$$

where:

R is distance between the caustic layer and an eye;

$d_s$ is a distance between the point-like light source and the optical security element; and $d_R$ is a comfortable reading distance from the eye, which is at least 25 cm.

The optical security element according to the invention is used for marking an object selected from the group comprising: consumer products, value documents and banknotes.

According to yet another aspect, the present invention relates to a marked object, selected from a group comprising consumer products, value documents and banknotes, which comprises the optical security element with security features that can be easily authenticated visually by a person, using either no further means (i.e. with naked eye) or commonly and easily available means (e.g. a mere commonly available point-like light source).

According to yet another aspect, the present invention relates to a method of visually authenticating an object, marked with the optical security element described herein by an observer, comprising the steps of:

illuminating the light-redirecting surface of the optical security element with a point-like light source at the distance $d_s$ from the light-redirecting surface;

visually observing a virtual image of a caustic pattern at distance $d_i$ from the optical security element; and deciding that the object is genuine upon evaluation by the observer that the caustic pattern is visually similar to a reference pattern.

According to yet another aspect, the present invention relates to a use of the optical security element as described herein, for authenticating or securing against counterfeiting an object selected from the group comprising consumer products, value documents, and banknotes.

The present invention will be described more fully hereinafter with reference to the accompanying drawings in which same numerals represent same elements throughout the different figures, and in which prominent aspects and features of the invention are illustrated.

DETAILED DESCRIPTION

Figure 1:
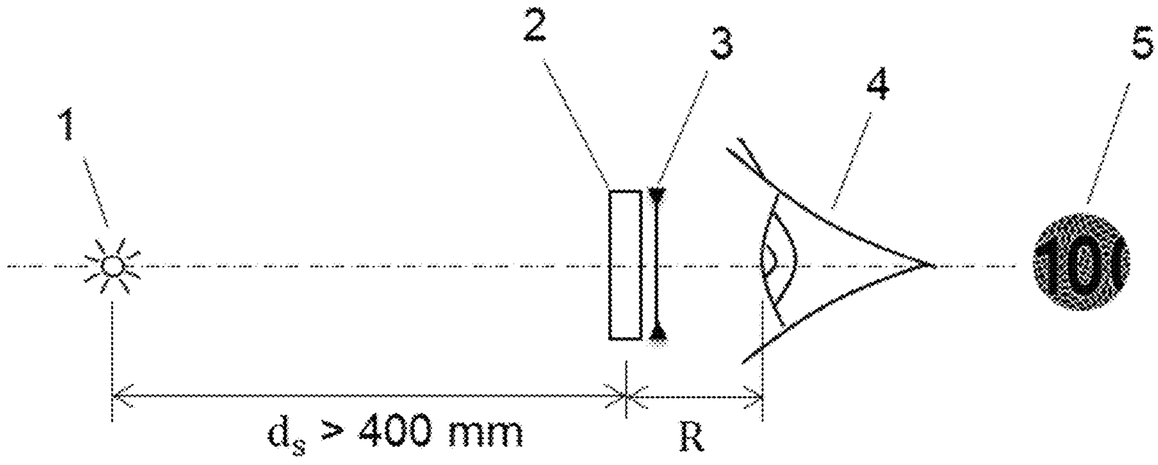
FIG. 1 is a schematic illustration of an optical configuration of the optical security element according to one aspect of the present invention, wherein the caustic layer has a positive focal length ($f_C>0$) and the lens element has a negative focal length ($f_L>0$).

In this description several terms are used, which are defined further below.

In optics, the term "caustic" refers to an envelope of light rays reflected or refracted by one or more surfaces, at least one of which is curved, as well as to projection of such light rays onto another surface. More specifically, a caustic is the curve or surface tangent to each light ray, defining a boundary of an envelope of rays as a curve of concentrated light. For example, the light pattern formed by sunrays at the bottom of a pool is a caustic "image" or pattern formed by a single refractive light-redirecting surface (the wavy air-water interface), whereas light passing through the curved surface of a water glass creates a cusp-like pattern on a table on which the water glass is resting as it crosses two or more surfaces (e.g. air glass, glass-water, air-water . . . ) which redirect its path.

An optical material substrate, used to make an optical (security) element, is for example a raw material substrate of which a surface is specifically formed, e.g. by machining, so as to have a relief pattern and thus form a light-redirecting surface. The optical material substrate can also be shaped by means of a replication process like embossing, molding, UV casting etc.

A suitable optical material substrate for a refractive light-redirecting optical element should be optically clear, transparent or at least partially transparent, and mechanically stable. For the purpose of the invention, i.e. providing an optical security element capable to generate a visually recognizable caustic pattern, a transparent or partially transparent material in fact corresponds to a low haze (H) and high transmittance (T) material, such that light diffusion does not impair forming a visually recognizable caustic pattern. Typically, a transmittance T>50% is preferred, and T>90% is most preferred. Also, a low haze H<10% can be used, but H<3% is preferred and H<1% is most preferred. A suitable optical material substrate should also behave correctly during the forming (e.g. machining) process, so as to give a smooth and defect-free surface. An example of a suitable substrate is an optically transparent slab of PMMA (also known under the commercial names of Plexiglas, Lucite, Perspex, etc.).

In case of a reflective light-redirecting surface, the optical material substrate is not necessarily homogeneous or transparent. For example, the material may be opaque to visible light (reflectivity is then obtained by classical metallization of the machined surface). An example of a suitable substrate is a metal, such as those used for masters of ruled gratings, and laser mirrors, or a non-reflective substrate which can be further metallized.

In this embodiment, the term "lens element" can be either a reflective caustic layer (like a "mirror" layer) applied on a surface of a substrate or can be a refractive caustic layer applied on a reflecting surface of a substrate (transfer element).

A "light-redirecting surface(s)" is the surface (or surfaces) of the optical security element responsible for redirecting the incoming light from a source onto projection surface, where the caustic pattern is formed. According to the present invention, the projection surface is a retina of an observer, as will be described hereinafter.

The term "caustic pattern" (or "caustic image") is referred to as the light pattern formed onto a projection surface when a suitably shaped optical surface (i.e. having an appropriate relief pattern) redirects light from a suitable (preferably, but not necessarily point-like) source to divert it from some regions of the projection surface, and concentrate it on other regions of the projection surface in a pre-determined light pattern (i.e. thus forming said "caustic pattern"). Redirection refers to the change of path of light rays from the source in the presence of the optical element with respect to the path from the source to the projection surface in the absence of the optical element. According to the invention, the projection surface to be considered is a retina of a human eye.

In turn, the curved optical surface will be referred to as "relief pattern", and the optical element that is bound by this surface will be referred to as optical security element. It should be noted that the caustic pattern may be the result of redirection of light by more than one curved surface and more than one object, although possibly at the price of increased complexity. Moreover, a relief pattern for generating a caustic pattern must not be confused with a diffractive pattern (like, for example, in security holograms). According to a preferred embodiment of the invention the maximum depth of the relief pattern of the optical security element is <250 μm or more preferably <30 μm, while being above the limit imposed by ultra-precision machining (UPM) and reproduction process, i.e. about 0.2 μm. According to this description, the height difference between the highest and lowest point in the relief pattern on the light-redirecting surface is referred to as relief depth.

The caustics elements are generally designed to project a light pattern on a screen behind the element. For illustrating a concept of the invention, a caustic surface may be modelled as a collection of small lens elements, i.e. "lenslets", jointly defining the surface. Thus, with this toy model, the caustic surface may be imagined as a collection of positive lenslets with focal length, for example, of approximately 40 mm. This is the distance at which the caustic image is formed in projection when illuminated with collimated beam. In fact, the security element is an optical assembly of a caustic layer (having a caustic surface with relief pattern) and a transfer element for redirecting incident light. The transfer element may be a lens element (or a plurality of coaxial lens elements) or a mere support element, possibly reflective, on which the caustic layer is applied.

For the real-life examples, the caustic layers are used in the present invention in combination with appropriate lenses (i.e. transfer elements), in order to obtain an image that is formed directly on the observer's retina. These caustic layers can be of two types:

- "positive" when they are capable (taken alone) of forming a real caustic image projected on a surface, upon illumination from a point light source;
- "negative" when they are capable of forming a virtual image (on the same side of the light source).

In both cases above (positive and negative caustic layers), the image is typically formed at a distance ($d_i$) of a few cm from the optical element; for example, at 40 mm when the source is at infinity (i.e. $d_s >> d_i$). This value is called herein the "focal length" ($f_C$) of the caustic layer, in analogy with the case of a classical lens. If a given surface of the caustic layer projects a real caustic image, the complementary surface would project an identical but virtual image, and vice-versa. The focal length of the two surfaces would also have the same absolute value (and opposite sign). In the examples given further below, both positive and negative caustic surfaces are used.

Returning to the images, the lens (as a transfer element) transforms a real image projected by the caustic element into a virtual image, at the appropriate reading distance, such that an image is created directly on the retina when looking through the sample. The image can be, for example, a logo, a picture, a number, or any other information that may be relevant in a specific context.

The terms "real image" and "virtual image" are used here in analogy with classical optics. For a real image, bundles of rays corresponding to image points converge. For a virtual image, (divergent) bundles of rays appear to originate from the corresponding image points when extended backwards, but if a screen is located at the location of the virtual image, no actual image would be formed on it.

Correspondingly, the virtual image of a light source is called a virtual source.

For the purpose of exploring a large number of optical surfaces, configurations, and parameters, manufacturing all the relevant caustic layers becomes prohibitively expensive, and optical modeling was used instead. Optical modeling was done with raytracing, using a commercial program (Zemax). It should be stressed that the accuracy of the modeling is comparable to that used for most applications in imaging optics (e.g. camera lens design). Hence, the results can be assumed to correspond to reality with a high degree of confidence.

The parameters used to model the human eye are summarized in table 1 below.

TABLE 1

| Human eye modelling parameters | |
|---|---|
| Focal length, f | 17 mm (e.g. 17 mm in air and 22 mm in water) |
| Iris diameter, $d_{iris}$ | 2.5 to 7 mm (e.g. 3 mm closed iris and 5 mm dilated iris) |
| Reading distance, $d_R$ | 250 mm |
| Eye imaging angle, θ | 5° (fovea - acute imaging)<br>20° (macula) |

FIG. 1 shows an optical scheme of the optical security element according to one aspect of the present invention, wherein the caustic layer has a positive focal length ($f_C>0$) and the lens element has a negative focal length ($f_L>0$). In order to see an image with the eye upon illumination by the light source 1, a caustic layer 2 with peak to valley height Δh=30 μm and focal length of 40 mm has been combined with a negative lens element 3 inserted next to it (in the illustrated embodiment on FIG. 1, on the eye side). As shown in FIG. 1, the light source 1 is located at the distance of at least 400 mm from the caustic layer 2. The setup is held in front of the eye 4, at a distance of about 20-30 mm, which is regarded as the eye relief distance R. An image 5 on the retina is also shown in FIG. 1. The beams exiting the optical security element are divergent and thus, the eye iris limits the field of view and the portion of the caustic image that is seen. The closer the optical element to the eye, the larger is the field-of-view and the larger is the portion of the caustic image that is seen.

Figure 2:
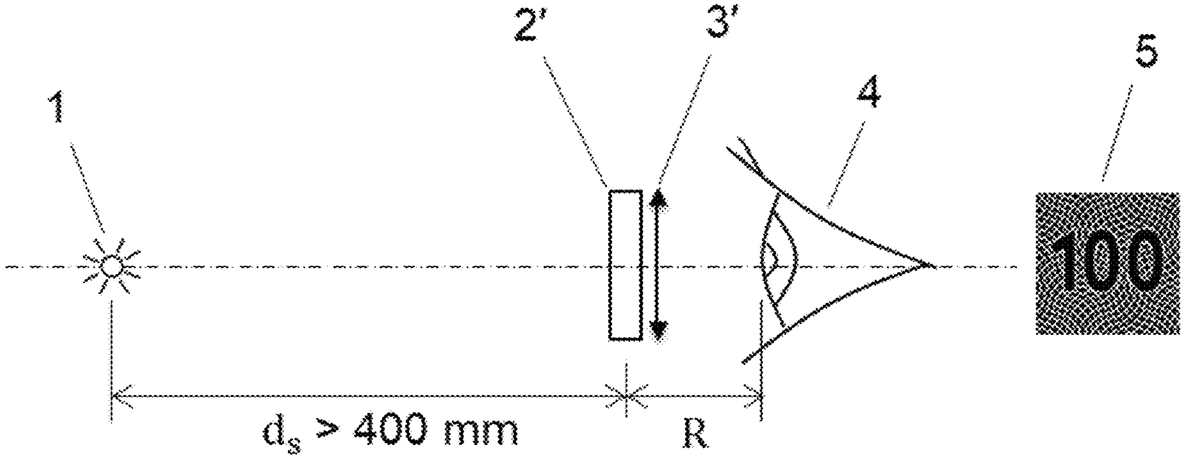
FIG. 2 is a schematic illustration of an optical configuration of the optical security element according to one aspect of the present invention, wherein the caustic layer has a negative focal length ($f_C<0$) and the lens element has a positive focal length ($f_L>0$).

FIG. 2 shows an optical scheme of an optical security element, wherein the caustic layer has a negative focal length ($f_C<0$) and the lens element has a positive focal length ($f_L>0$). The caustic element 2' has surface which is a negative copy of the original element used in FIG. 1 and as a result has negative focal length of −40 mm. It is combined with positive lens element 3' and is held similarly to the setup in FIG. 1 at distance R from the eye 4. As shown in FIG. 2, the light source 1 is located at the distance of at least 400 mm from the caustic element 2'. An image 5 is created on the retina of the eye. As shown on the figure a larger portion of the caustic image is seen compared to that in FIG. 1 as the rays at the exit of the security element are convergent and the eye iris is clipping less rays before reaching the retina.

Figure 3:
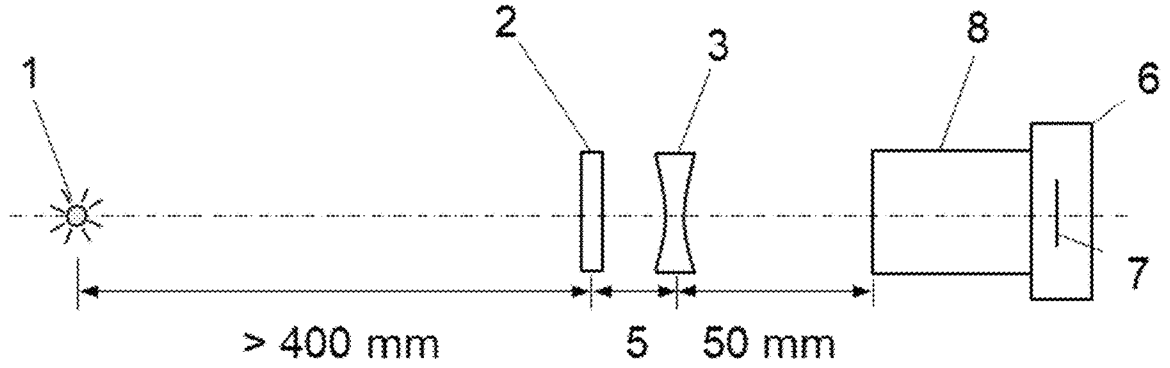
FIG. 3 illustrates a schematic setup used to record physical images following the optical configuration illustrated in FIG. 1.

A schematic setup used to record physical images is shown in FIG. 3. The eye is simulated by a commercial camera module 6 (uEye UI-1225LE-C-HQ) fitted with a 16 mm focal length objective 8 (Fujinon HF16A-1B) focused at 250 mm, and a VGA color sensor 7. The setup is chosen to acquire images that resemble what is seen by the eye. In this case, a caustic layer 2 with peak to valley height Δh=30 μm (machined over a 2 mm thick 10×10 mm PMMA slab) and focal length of 40 mm is combined with a negative lens element 3 inserted next to it. The negative lens elements 3 being used have respective focal lengths of −15, −30, −50, and −125 mm. In the embodiment shown in FIG. 3, the distance between the negative lens element 3 and the objective 8 is 50 mm. The light source 1 is a flash lamp of a mobile phone, in the present non-limiting embodiment being a LED of a Samsung S3 phone. As shown in FIG. 3, the light source 1 is located at the distance of at least 400 mm from the caustic layer 2.

The camera sensor simulated the retina, where the caustic image was formed. In some cases, a larger aperture has been also used, to maximize the field-of-view. In the present disclosure, the term "field of view" means the lateral size of the visible window, not its angular size. It was also noted that with the given distance to caustics element of about 50 mm the image registered by the camera was similar to what was seen with the eye in a normal office environment when looking through the caustic element at a pocket torch while the iris is at about 3 to 4 mm open.

Figure 4:
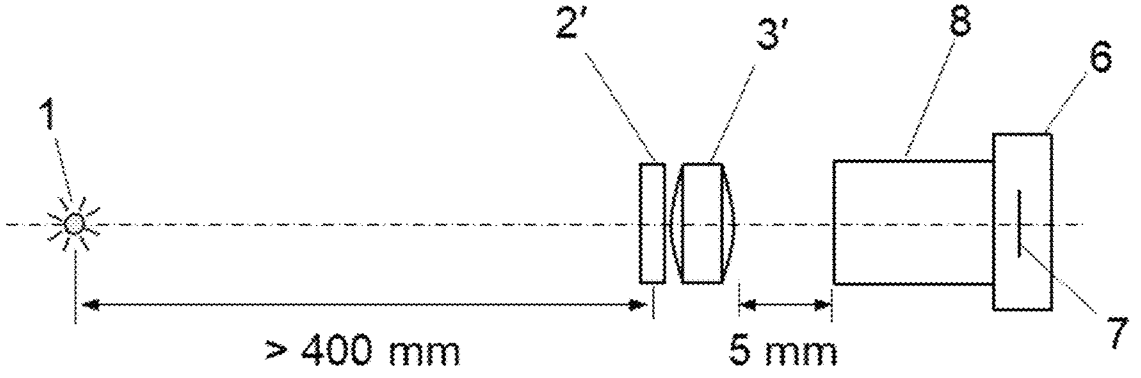
FIG. 4 illustrates a schematic setup used to record physical images using a caustic layer with negative focal length coupled to a positive lens.

FIG. 4 shows a schematic setup used to record physical images. Like in FIG. 3, the eye is simulated by a commercial camera module 6 (uEye UI-1225LE-C-HQ) fitted with a 16 mm focal length objective 8 (Fujinon HF16A-1B) focussed at 250 mm (diaphragm fully open), and a VGA color sensor 7, and the light source 1 is a flash lamp of a mobile phone (in the present non-limiting embodiment being LED of a Samsung S3 phone). A caustic layer 2' with peak to valley height Δh=30 μm (obtained as a surface copy of the caustic layer used in FIG. 3) and negative focal length of −40 mm is combined with a positive lens element 3' inserted next to it. The positive lens elements 3' have respective focal lengths of 40 mm and 50 mm. In the embodiment shown in FIG. 4, the distance between the negative lens element 3 and the objective 8 is 5 mm. The light source 1 is located at the distance of at least 400 mm from the caustic layer 2'.

Figure 5:
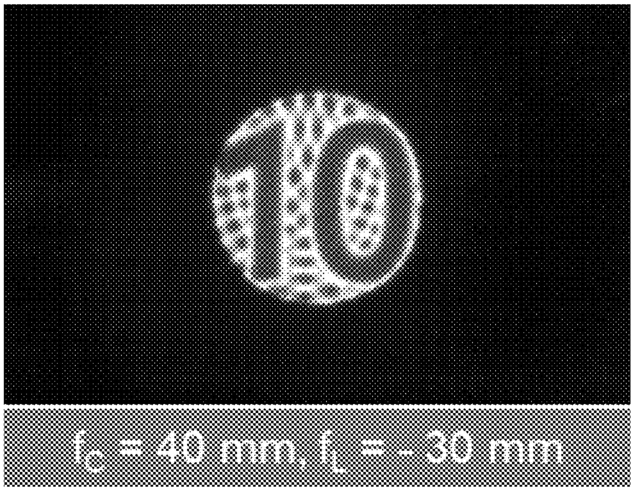
FIG. 5 and FIG. 6 show examples of the images acquired with the above-mentioned setup using a positive caustic layer designed to project a caustic image on a surface at 40 mm behind the optical security element ($f_C$=40 mm), coupled to negative lens elements having $f_L$=−30 mm and $f_L$=−50 mm, respectively.
Figure 6:
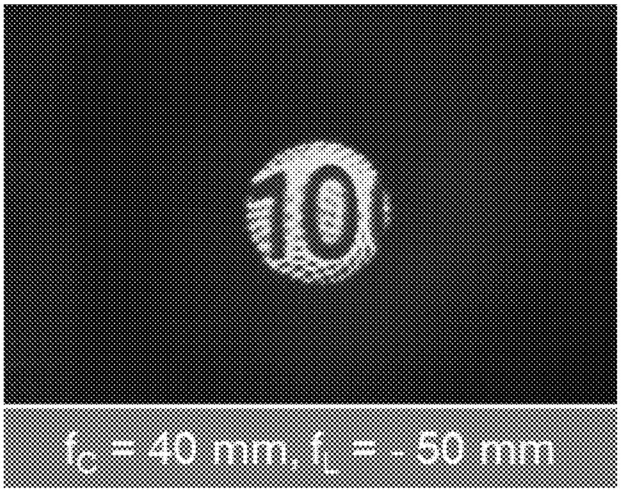

FIG. 5 and FIG. 6 show examples of the images acquired with the above-mentioned setup of FIG. 3 using negative lens elements having $f_L$=−30 mm and $f_L$=−50 mm, respectively, and caustic layers with focal lengths $f_C$=40 mm.

In particular, FIG. 5 depicts a sharp image with the field of view (FOV) which can cover only ⅔ of the symbol 100. This is what is seen with the eye when looking through the element in direction to a flash lamp of a mobile phone.

In turn, FIG. 6 depicts that using the negative lens element having $f_L$=−50 mm the image starts to be blurred as the negative lens element is not powerful enough to compensate for the positive focal length of the caustic layer. The FOV is bigger than with lens element having $f_L$=−30 mm, and a larger portion of the image is seen. However, the image occupies a smaller area on the sensor ("retina"). Accordingly, by increasing the focal length, the field-of-view is increased but the magnification is decreased.

Figure 7:
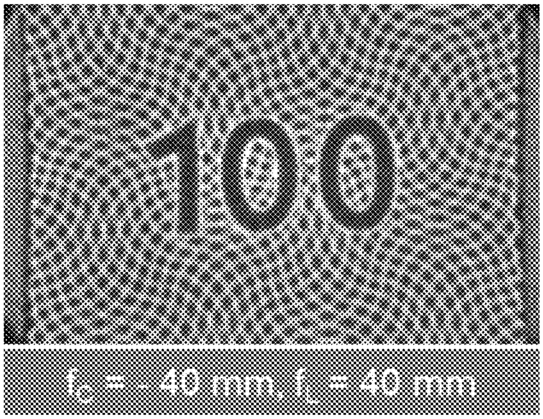
FIG. 7 and FIG. 8 show examples of images acquired with the setup described in FIG. 4 which is using a negative focal length ($f_C$=−40 mm) copy of the caustic optical element used in FIG. 5 and FIG. 6 and is coupled to positive lens elements having focal lengths $f_L$=40 mm and $f_L$=50 mm, respectively.
Figure 8:
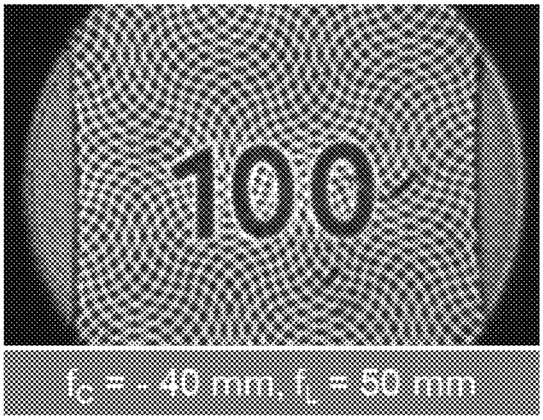

FIG. 7 and FIG. 8 show examples of images acquired with the setup described in FIG. 4. A copy of the caustic layer used to generate the images in FIG. 5 and FIG. 6 is used here as a negative caustic layer, with focal length $f_C$=−40 mm, to generate the images in FIG. 5 and FIG. 6. Positive lenses $f_L$=40 mm and $f_L$=50 mm are used to create virtual images suitable for observation. In both cases the part of the caustic pattern that is seen is much larger compared to the examples given in FIG. 5 and FIG. 6. This is due to converging light beams after such optical security elements. In case shown on FIG. 8 the magnification is smaller and part of the circular clipping is due to lens aperture of 12.7 mm. In either case such configuration allows to see fully the aperture of the caustic layer with dimensions 10×10 mm.

For the purpose of determining the relevant parameters, and the practical range of applicability of the optical elements, the functions performed by each component of the optical assembly forming the optical element are described and analysed separately.

Figure 9:
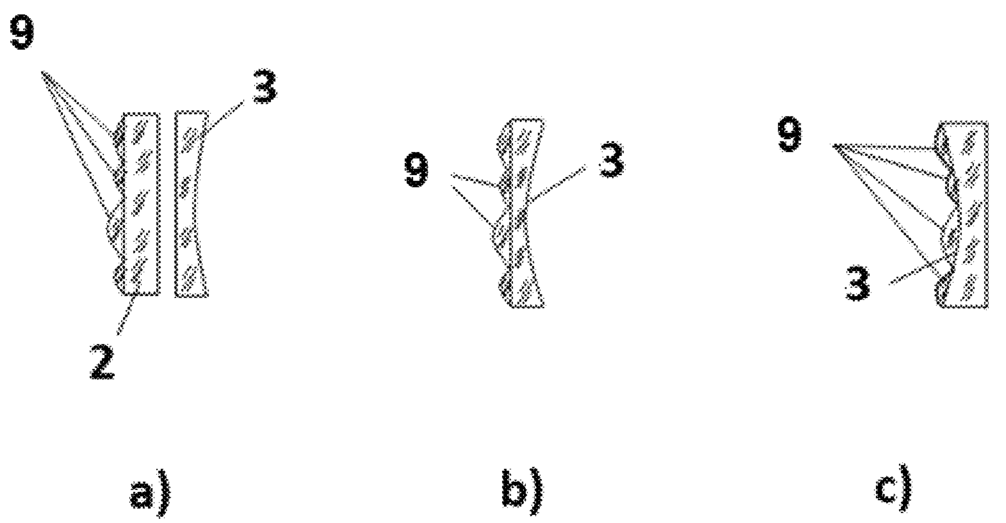
FIG. 9 shows examples of possible optical security elements comprising: a) element with a positive caustics layer 2 with individual positive lenslets 8 with a separate negative lens element 3, b) element with a caustics layer 2 and with a back surface being a negative lens element 3, c) caustics layer 2 over a surface of the negative lens element 3 (sum of both surfaces).
Figure 10:
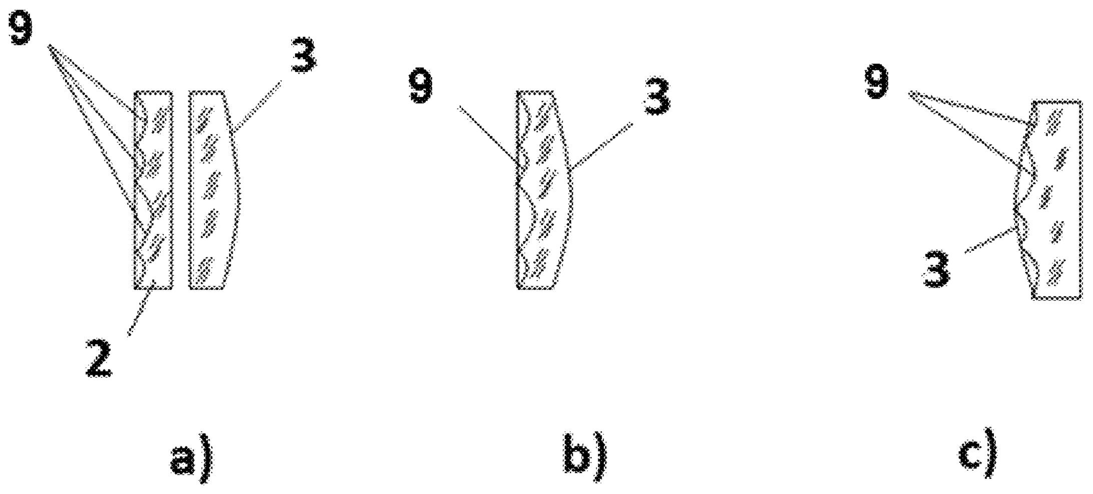
FIG. 10 shows examples of possible optical security elements comprising: a) element with a negative caustics layer 2 and a separate positive lens element 3, b) element with a negative caustics layer 2 and with a back surface being a positive lens element 3, c) negative caustics layer 2 over a surface of the positive lens element 3 (sum of both surfaces).

In an actual optical element, these functions can be performed together by a single element acting both as a caustic-layer and as a transfer element or separately by an optical assembly of one caustic layer and one (or more) transfer element as illustrated by FIG. 9 and FIG. 10.

FIG. 9 shows examples of possible optical elements comprising: a) element with a caustic layer 2 with lenslets 9 and a separate negative (plano-concave) lens element 3 (transfer element), b) element with a caustic layer with lenslets 9 and a transfer element with a curved back surface being a negative lens element 3, c) caustic layer with lenslets 9 over a curved surface of a (plano-concave) negative lens element 3 (sum of both surfaces).

FIG. 10 shows examples of possible optical elements comprising: a) element with a negative caustics layer 2 with lenslets 9 and a separate (plano-convex) positive lens element 3, b) element with a negative caustics layer with lenslets 9 and with a back surface being a positive lens element 3, c) negative caustics layer with lenslets 9 over a surface of a positive lens element 3 (sum of both surfaces). It should be noted that all surfaces that have a sag (curvature height) above maximum allowed by the external constraints (peak to valley extending predefined maximum) can be reduced by "Fresnelization" technique.

Furthermore, as a convenient toy model system, an array of micro-lenses is used to project a "caustic image" (or "caustic pattern") consisting of a regular array of dots. For the purpose of explaining the working principle of the invention, this approach has several advantages over the use of a more elaborated caustics layer surface:

- the chosen system is very simple to understand, describe, and model;
- it contains the most relevant features of a caustic layer;
- the relevant parameters can be analytically defined, and they have a well-defined meaning (e.g. the focal length of the caustic layer).

The concepts thus explored can then be transferred in a straightforward way to the more elaborated case of a generic caustic layer surface. Within this scheme, an optical element combines the following functions:

- creating a caustic image (real or virtual) at some location in space (not necessarily within the accommodating power of the eye);
- transferring the caustic image to an appropriate location, such that it can be focused by the eye onto the retina. Given the accommodating power of the eye, the relayed image shall be located least at 25 cm from the eye. In practice, the optical element is positioned right in front of the eye, or at most a few cm away from it, hence the relayed image is formed behind the optical element (virtual image);
- directing the image forming rays in such a way that they can pass through the pupil without being clipped.

There are two main ways to achieve the first two functions (the third function will be discussed separately further below).

Figure 11:
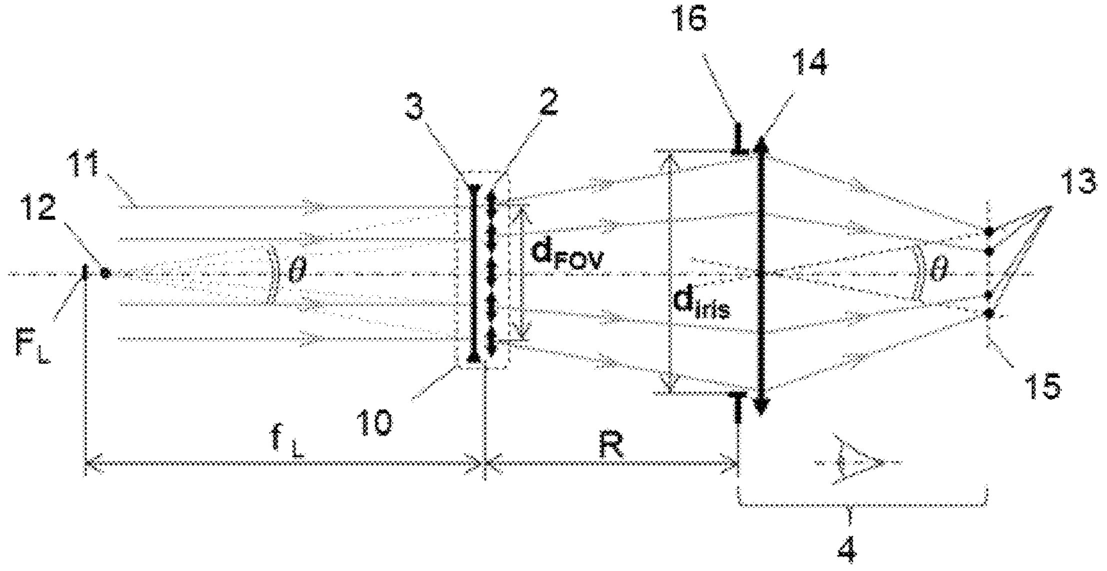
FIG. 11 and FIG. 12 illustrate optical schemes of creating an image onto the retina by the ensemble of lenslets of the caustics layer of the optical security element, wherein the caustic layer having a positive focal length ($f_C>0$) and the lens element having a negative focal length ($f_L<0$) are combined.
Figure 12:
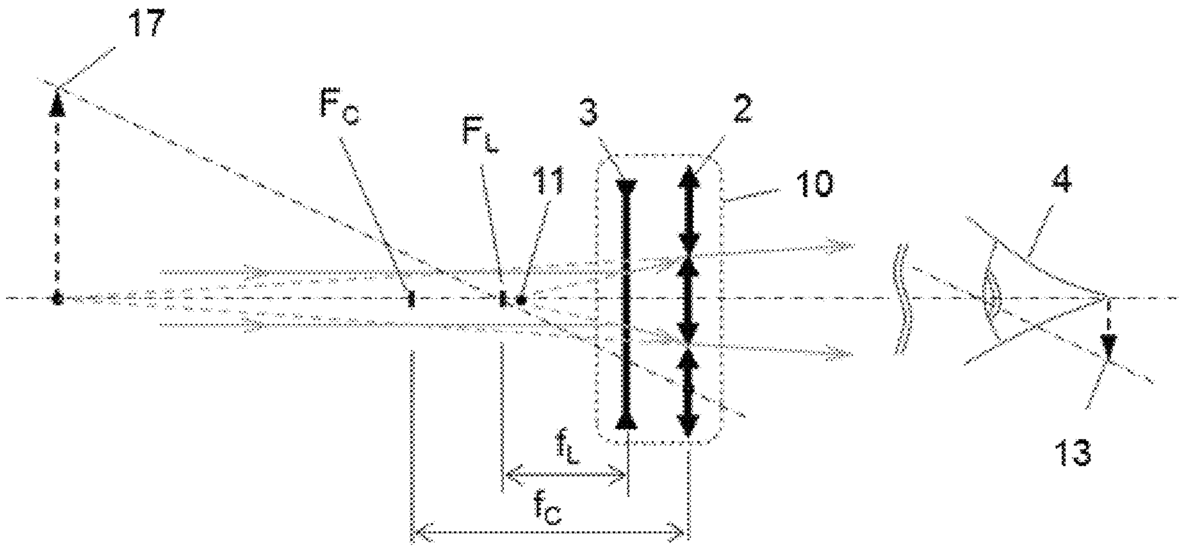

One embodiment consists in combining a caustic layer having a positive focal length ($f_C>0$) and a lens element having a negative focal length ($f_L>0$), see FIG. 9 and further FIGS. 11-12 depicting optical schemes of creating an image onto the retina by the ensemble of lens 3 and lenslets of the caustics layer 2 of the optical element 10. Using the above toy model to explain this embodiment, with a collimated light beam 11 from a source located at far distance or infinity, the negative lens element 3 creates a virtual image 12 of the source. The virtual image 12 is located between the optical element 10 and the focal point of the lens 3. Light originating from the virtual image 12 is split into light fields by the lenslet array and the eye lens 14 creates multiple bright points onto the retina, which are multiple images 13 of the virtual source 12, with each bright spot corresponding to a lens from the lenslet array. The eye lens 14 acts as Fourier lens, focusing all parallel beams in one point on the retina. The ensemble of bright points on the retina image plane 15 forms a raster like a caustic image.

Alternatively, the positive caustic surface can be seen as projecting a real image (one point per lenslet), which is transformed by the negative lens into a virtual image at the appropriate distance from the eye indicated as 17 on FIG. 12. It should be noted that an optical element with positive caustic layer has a field-of-view (FOV) diameter which is limited by the iris diameter 16. This limitation can be seen in the formulas:

$$d_1=d_{iris}|f_L|/(|f_L|+R),$$

$$d_2=2|f_L|\tan(\theta/2), \text{ and}$$

$$d_{FOV}=\min(d_1,d_2).$$

where $d_{iris}$ is the iris diameter, R is distance between the caustic layer and an eye, $f_L$ is the focal length of the lens element, and θ is the eye imaging angle under consideration. For example, considering only the highest resolution portion of the eye (fovea) θ=5° while considering also the portion of the retina with lower resolution, θ=20° (see Table 1).

In the limiting case where R tends towards zero the $d_{FOV}$ is the greatest, but never larger than the eye iris. Moreover, a case with R=0 mm is impossible as there should be always some distance from eye to the caustic layer.

Figure 13:
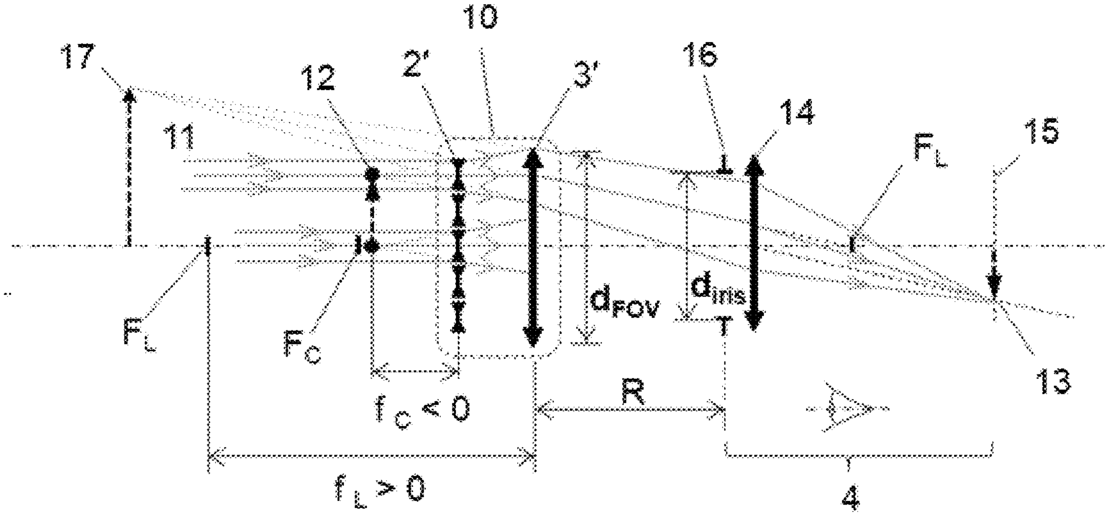
FIG. 13 and FIG. 14 show optical schemes of creating an image onto the retina by the ensemble of lenslets of the caustic layer of the optical security element, when the caustic layer having a negative focal length ($f_C<0$) and the lens element having a positive focal length ($f_L>0$) are combined.
Figure 14:
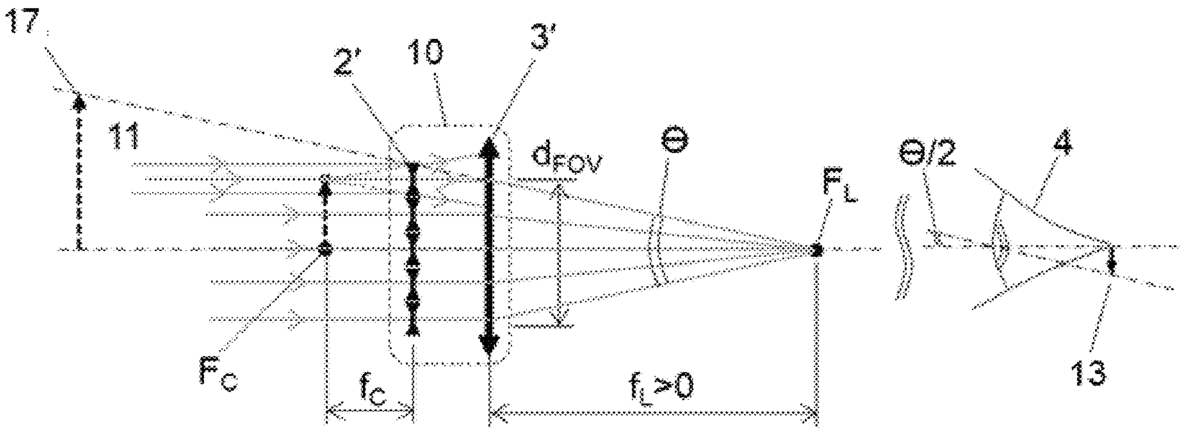

Another embodiment consists in combining the caustic layer having a negative focal length ($f_C<0$) and the lens element having a positive focal length ($f_L>0$), see FIG. 10 and further FIG. 13 and FIG. 14 depicting optical schemes of creating an image onto the retina (retina image plane 15) by the ensemble of lenslets of the caustic layer 2' combined with the positive lens element 3' in an optical element 10.

As already mentioned, a caustic layer having a negative focal length ($f_C<0$) is capable of forming a virtual caustic image 12 on the same side of the light source. Each of the small lenses of the caustic layer 2 creates a virtual source (virtual image of the source) before the lens element 3. The set of these virtual sources is a virtual object which is then imaged by the following positive lens element 3 to form the virtual caustic image 17 that the eye itself images onto its retina 15 in the form of image 13. It should be noted that the focal length of the positive lens should be chosen to be equal or longer than the absolute value of the focus of the caustic lenslets. This allows creation of the virtual caustic image 17 farther than the minimum reading distance $d_R$ for the eye and prevents straining the eye to image rays from converging cone of light. Thus, forming a virtual image at appropriate distance $d_R$ makes eye accommodation easier.

Here the part of the caustic layer that is seen by the eye, i.e. the diameter of the field of view ($d_{FOV}$), is defined by the eye imaging angle θ and the diameter of the eye iris $d_{iris}$, see FIG. 13 and FIG. 14. In this case:

$$d_{FOV}=\min(d_1,d_2)$$

where:

$d_1=2f_L\tan(\theta/2)$ $d_2=d_{iris}/|1-R/f_L|$

In general, increasing the distance R up to the focal length of the lens $f_L$ allows to see a bigger part of the optical element (contrary to the case of positive caustic layer). As in the previous example, the eye imaging angle θ under consideration determines how accurate the caustic image is going to be seen. Above the fovea angular limit (above 5°) the caustic image is perceived by the eye but with decreasing resolution.

The requirement that the virtual image is formed at a comfortable reading distance $d_R$ from the eye (conventionally, at least 25 cm), translates into the following equation:

$$R-\left(\frac{1}{f_L}+\frac{1}{f_C}\right)^{-1}\geq d_R$$

where:

- $f_L$ and $f_C$ are the focal lengths of the lens element and the caustic layer, respectively;
- R is distance between the caustic layer and an eye; and
- $d_R$ is a comfortable reading distance from the eye, which is at least 25 cm.

It should be noted that the above-mentioned formula is asymptotically exact for a light source at infinity. For a finite distance ds of the source, the right equation is in fact:

$$R-\left(\frac{1}{f_L}+\frac{1}{f_C}-\frac{1}{d_s}\right)^{-1}\geq d_R$$

In practice, ds is large enough to be considered at infinity (and thus $1/d_s\approx0$), so that the asymptotic formula is used in the following discussion.

As already pointed out, not all of the rays that appear to originate from the virtual source can enter the pupil and reach the retina, as some of them are blocked by the iris. Correspondingly, only a portion of the target image forms on the retina, and the rest is clipped. Which portion of the image is ultimately visible depends on the geometry and lens parameters, as shown in FIG. 11 to FIG. 14.

In particular, when a negative caustic layer is combined with a positive lens element, the envelope of the ray bundles is converging towards the pupil. Conversely, when a positive caustics layer is combined with a negative lens element, the envelope of the ray bundles is diverging. Hence, for the purpose of having a larger portion of the image visible, it is preferable to work with a negative caustic layer combined with a positive lens element.

More specifically, if the diameter of the field of view ($d_{FOV}$) is defined as the diameter of the portion of the caustic layer which is actually contributing to the image formed on the retina, it can immediately be seen that:

- when a positive caustics layer is combined with a negative lens element, $d_{FOV}$ is bound to be smaller than the pupil diameter $d_{iris}$, since $d_{FOV}=d_{iris}|f_L|/(|f_L|+R)$;
- when a negative caustic layer is combined with a positive lens element, $d_{FOV}$ can be substantially larger than $d_{iris}$, depending on the exact geometry and if the restriction defined from the maximum eye imaging angle θ is relaxed.

In the case of a positive caustics layer combined with a negative lens element, the image is clipped by the iris. For a given focal length of the caustic layer, the longer the focal length of the lens element (in absolute value, $|f_L|$), the larger the portion of the caustic image projected on the retina. However, $|f_L|$ cannot be made arbitrary large, since for $|f_L|>f_C$ the accommodating power of the eye is no longer sufficient to bring the image into focus on the retina, as it will not satisfy the Equation (E). Also, even as $|f_L|$ increases, the perceived size of the image does not. In other words, more of the image becomes visible simply because the details become smaller, not because the image frame becomes larger.

Figure 15:
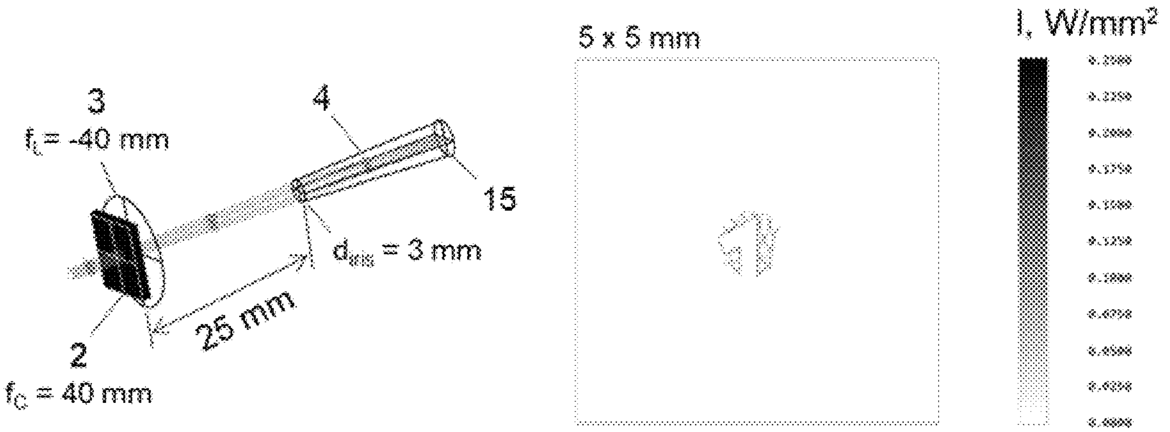
FIG. 15 and FIG. 16 show an optical setup and simulated (ray-traced) images created by an optical security element having positive caustic layer with $f_C$=40 mm adjacent to a negative lens with $f_L$=−40 mm and is positioned at 25 mm from a model of an eye with iris diameter of 3 mm and 5 mm respectively.
Figure 16:
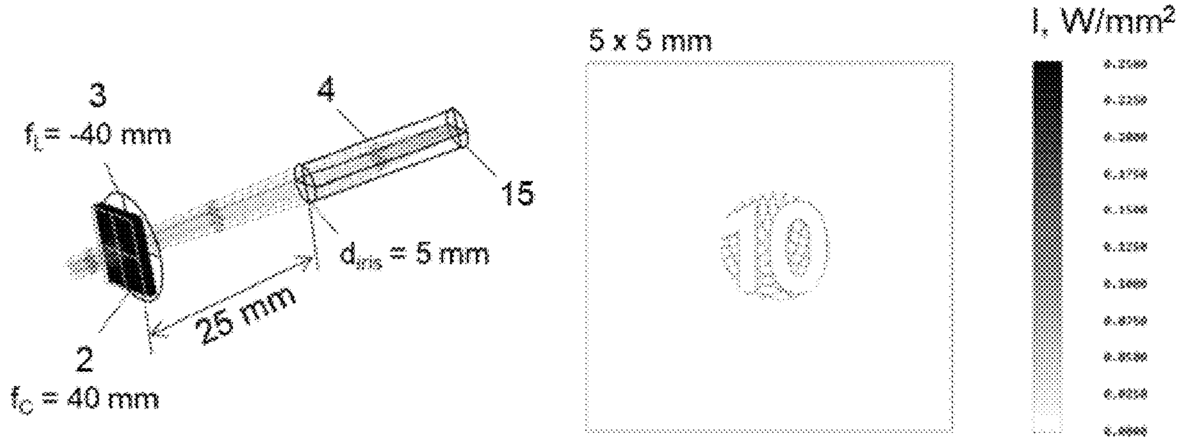

FIG. 15 and FIG. 16 show a use of an optical security element placed at 25 mm from the eye of an observer and built with a positive caustic layer with focal length $f_C$=40 mm associated with a negative lens element of focal length $f_L$=−40 mm. The divergent light from the optical element is clipped by the iris of the eye with diameter $d_{iris}$=3 mm as shown in FIG. 15. Small part of the whole caustic image is seen. Despite the limited field of view, the eye can scan the image to see much larger part of the intended caustic image to assure the authenticity of the object.

One way to increase the part of the caustic pattern to be seen is to decrease transmitted light and force the eye to open its iris. FIG. 16 shows a larger part of the caustic pattern that is seen by the eye when the iris is open to $d_{iris}$=5 mm. The image on eye's retina shown on right is similar to the image that is acquired by a camera as shown on FIG. 5 with caustic layer with focal length $f_C$=40 mm and negative lens element with focal length $f_L$=−30 mm.

It should be pointed out that under physiologically normal circumstances, the eye responds to light by closing the pupil, which results in a conflicting situation: on one hand, one would want a bright image to be formed on the retina, while at the same time the pupil should stay open as wide as possible.

From these considerations it is apparent that the combination of a positive caustics layer with a negative lens element can be used to project a caustic image onto the retina, but it is not optimal with respect to user experience.

In the case of a negative caustic layer combined with a positive lens element, the problem of clipping can be solved with an appropriate choice of the geometry and parameters. Because with this scheme the ray bundles converge towards the pupil, a larger fraction of the image is normally visible, for a given pupil diameter.

If the eye iris is considered to be open from 3 to 5 mm in normal conditions, so e.g. a caustic layer having a negative focal length −40 mm and positive lens 40 mm, held at a distance of 25 mm from the eye, would allow seeing a portion of the caustic element larger than 7.5 mm.

Figure 17:
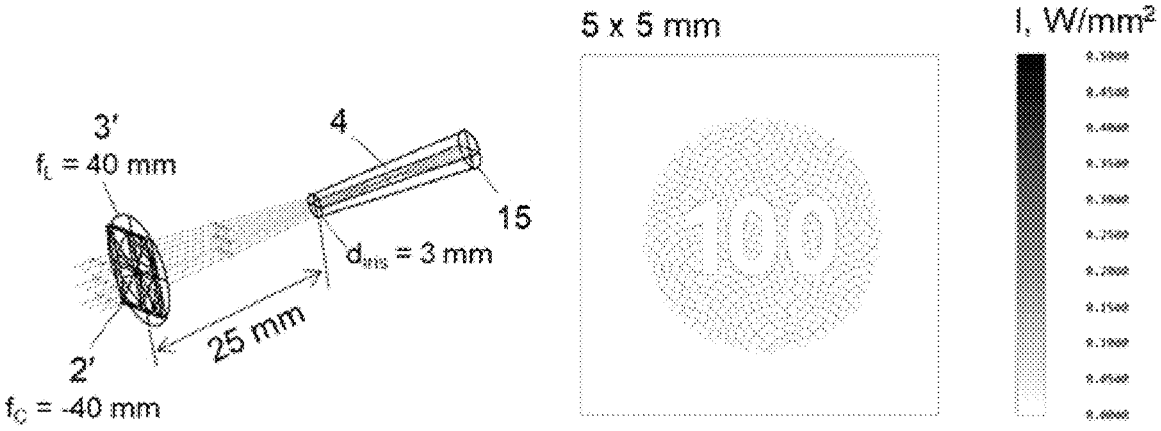
FIG. 17 and FIG. 18 show simulated (ray-traced) images created by an optical security element having negative caustic layer with $f_C$=−40 mm adjacent to a positive lens with $f_L$=40 mm and is positioned at distances 25 mm and 40 mm respectively from a model of an eye with fixed iris diameter of 3 mm.
Figure 18:
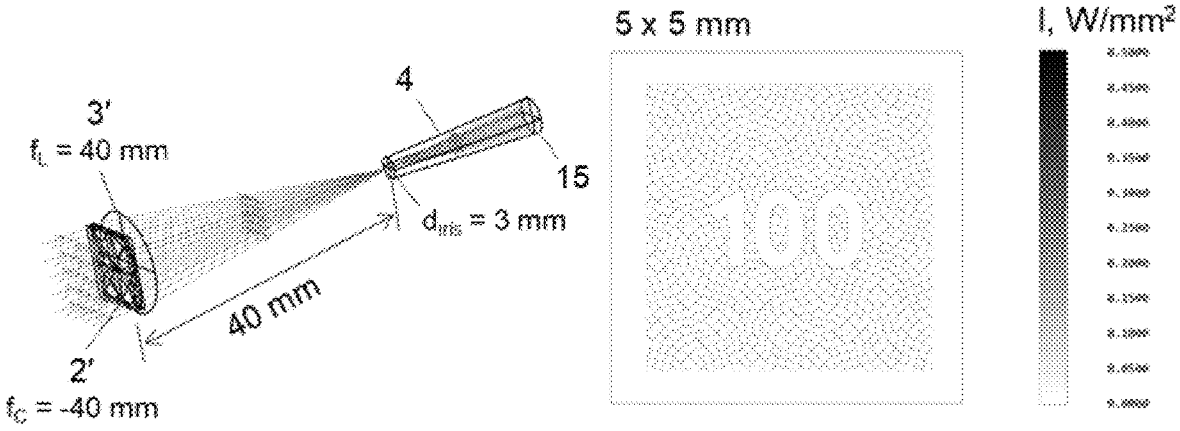

Preferably, in order to see an even larger portion of the caustic layer, it is possible to increase the distance from the eye from 25 mm to e.g. 40 mm as shown in FIG. 17 and FIG. 18. In the general case of a negative caustic element combined with a positive lens element, the optimum distance from the eye is approximately equal to the focal length of the positive lens element.

FIG. 17 and FIG. 18 show simulated (i.e. ray-traced) images created by an optical security element having negative caustic layer with $f_C$=−40 mm adjacent to a positive lens with $f_L$=40 mm and is positioned at distances 25 mm and 40 mm respectively from a model of an eye 4 with fixed iris diameter of 3 mm. In FIG. 17, the left part of the figure shows the setup consisting of a caustic layer slab and a negative lens element with an eye 4 of observer at distance of 25 mm, and the right part of the figure shows the caustic image that is projected on the retina of an observer. The observed caustic image is not complete as the eye iris with diameter of 3 mm is clipping some rays which are redirected from the relief pattern built with negative lenslets and coupled to a positive lens and held at 25 mm from the eye. Longer distance between caustic element and the eye helps reducing the clipping of the caustic image as shown in FIG. 18. Another way to reduce the clipping of the caustic image is to reduce the intensity of the image by reducing the transmission of the caustic element and thus forcing the eye to open its iris to say 5 mm or bigger diameter.

In the particular case, when the eye distance from the caustic layer is equal to the focal length of the positive lens element, all the ray bundles converge together and go through the pupil undisturbed.

The relationship between the focal lengths of the lens element and the caustic layer must still satisfy equation (E) for the eye to be able to focus the ray bundles on the retina.

Up to now, the functions performed by the caustic optical element and the lens have been described separately and modeled with two distinct components. This is convenient for the purpose of understanding and explaining (i) how the caustic image is formed, and (ii) which are the relevant parameters. In practice, however, there is no strict requirement in this sense, and the two functions can be combined in a single "effective" component.

Where a caustic layer surface and a lens element surface are combined together in a single optical surface, the combined surface can be calculated directly by adapting the numerical methods that are used for the calculation of the caustic surface alone. However, in most cases, the paraxial, thin element approximation is valid. Conveniently, then this new surface corresponds simply to the algebraic sum of the two individual surfaces. In other words, if the lens element surface, with z axis along the optical axis of the optical assembly, is given by $z=g_L(x,y)$, and the caustic layer surface by $z=g_C(x,y)$, then the resulting equivalent combined surface is given by $z=g_L(x,y)+g_C(x,y)$.

According to the present invention, the caustic layer can have the negative focal length $f_C$ ranging from −30 mm to −50 mm, for example, $f_C$=−40 mm and is combined with the lens element having a positive focal length $f_L$ ranging from 30 mm to 50 mm, for example $f_L$=45 mm, the lens element being a plano-convex lens.

Figure 19:
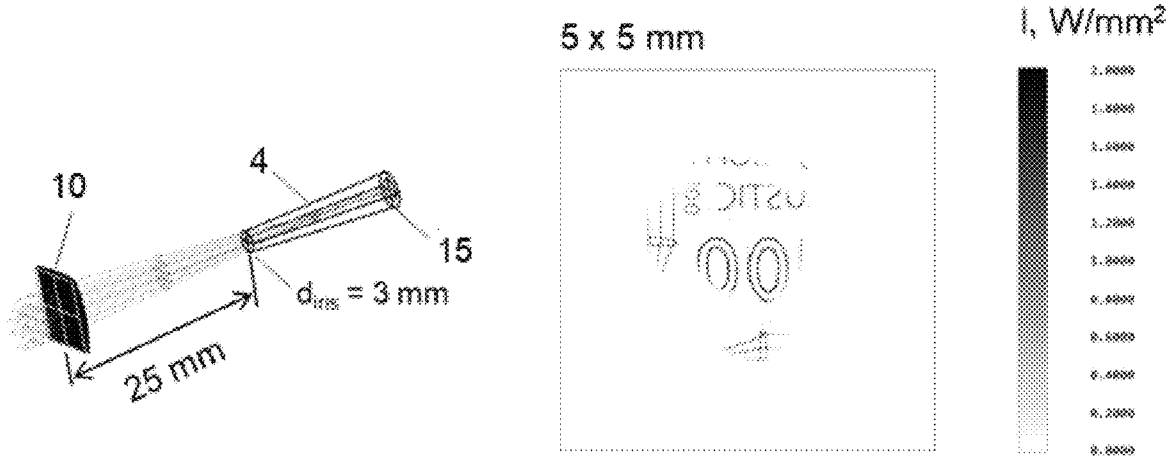
FIG. 19 and FIG. 20 show images created by the optical element having the caustic layer with $f_C$=−40 mm and the lens element with $f_L$=45 mm, wherein the caustic layer with the negative focal length is put over the lens element with the positive focal length.
Figure 20:
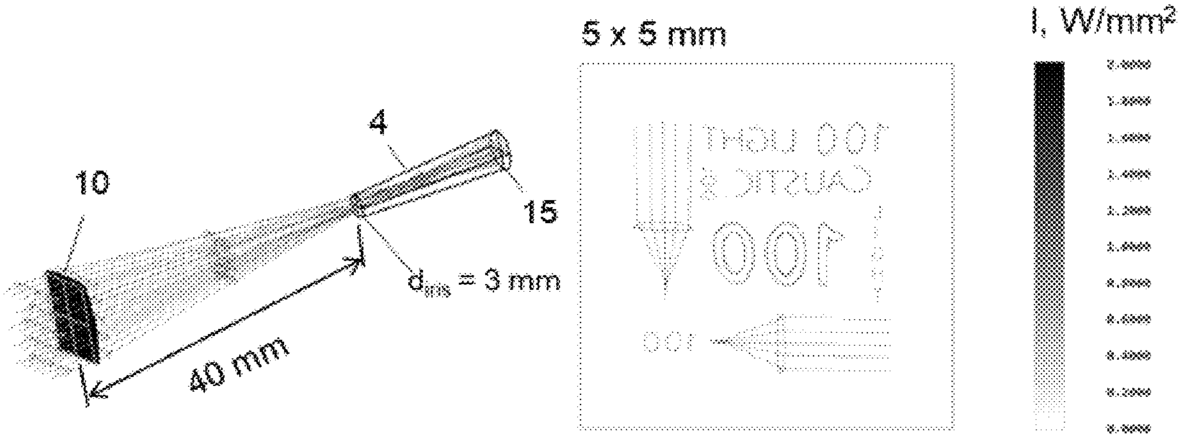

FIGS. 19-20 show images created by the optical element having the caustic layer with $f_C$=−40 mm and the lens element with $f_L$=45 mm, wherein the caustic layer with the negative focal length is put over the lens element with the positive focal length.

In this regard, as shown on FIG. 19, for an eye iris diameter $d_{iris}$=3 mm the field seen by the eye at the eye relief distance of 25 mm does not correspond to the full image and is even not circular. Moving away the caustics to a distance of more than 25 mm, for example, for 40 mm, opens the field of view (FOV), which improves the quality of the created image. This is duly illustrated by FIG. 20.

According to the present invention, the optical security element may be applied to or incorporated into an object, selected from a group comprising consumer products, value documents and banknotes, thereby producing a marked object according to the invention.

Said object may be easily visually authenticated by an observer using a method of visually authenticating the marked object, comprising the steps of:

illuminating the light-redirecting surface of the optical security element with a point-like light source at the distance ds from the light-redirecting surface;

visually observing a virtual image of a caustic pattern formed at a distance from the eye larger than a comfortable reading distance $d_R$ (i.e. compatible with the accommodating power of the eye); and deciding that the object is genuine upon evaluation by the observer that the projected caustic pattern is visually similar to the reference pattern.

In other words, authenticity of the optical security element (and thus, that of the object marked with this security element) can be evaluated directly by visually checking a degree of resemblance between the projected caustic pattern and the reference pattern.

The optical security element according to the invention may be used for authenticating or securing against counterfeiting an object selected from the group comprising consumer products, value documents and banknotes. Such use generally comprises, but not limited to, marking the object with the optical security element and visually authenticating the marked object, as mentioned above.

Accordingly, the marked object can be authenticated by a "person in the street", using commonly available means. Upon illumination by a suitable light source, an image is projected directly on the retina of the observer and does not modify the transparency of the object onto which it is applied. Advantageously, it can be operated even with a weak light source (e.g. a reflection on a surface, an indicator LED etc.). Moreover, the image projected by the feature does not have a significant chromatic aberration and does not suffer from significant artefacts from residual-stray light that is not used to form the image.

The above disclosed subject matter is to be considered illustrative, and not restrictive, and serves to provide a better understanding of the inventions defined by the independent claims.

The invention claimed is:

1. An optical security element made of a refractive transparent or partially transparent optical material and comprising an optical assembly of a caustic layer having a light-redirecting surface with a relief pattern of given depth and a focal length $f_c$ and an adjacent lens element of focal length $f_L$ configured to redirect incident light received from a point-like light source through it and form a projected image containing a caustic pattern directly on a retina of an observer looking at the point-like source through the optical security element; wherein the optical security element comprises one of the following:

a) the caustic layer has a positive focal length ($f_C$>0) and the lens element has a negative focal length ($f_L$<0), or b) the caustic layer has a negative focal length ($f_C$<0) and the lens element has a positive focal length ($f_L$>0); and wherein a relationship between the focal length of the lens element and the focal length of the caustic layer satisfies following equation:

$$R-\left(\frac{1}{f_L}+\frac{1}{f_C}-\frac{1}{d_s}\right)^{-1}\geq d_R,$$

where:

R is distance between the caustic layer and an eye of the observer;

$d_s$ is a distance between the point-like light source and the optical security element; and $d_R$ is a comfortable reading distance from the eye, which is at least 25 cm.

2. The optical security element according to claim 1, wherein the positive focal length is chosen to be equal or greater than the absolute value of the negative focal length.

3. The optical security element according to claim 1, wherein the negative focal length ranges from −15 mm to −125 mm, in particular from −30 mm to −50 mm.

4. The optical security element according to claim 1, wherein the caustic layer has the negative focal length $f_C$ ranging from −30 mm to −50 mm and is combined with the lens element having a positive focal length $f_L$ ranging from 30 mm to 50 mm, the lens element being a plano-convex lens.

5. The optical security element according to claim 1, marking an object selected from the group comprising: consumer products, value documents and banknotes.

6. An optical security element comprising a reflective light-redirecting surface of an optical assembly formed by a caustic layer having a relief pattern of given depth and a focal length $f_C$ and an adjacent optical material layer of focal length $f_L$, said optical assembly being configured to redirect incident light received from a point-like light source and to form a projected image containing a caustic pattern directly on a retina of an observer; wherein the optical security element comprises one of the following:

a) the caustic layer having a positive focal length ($f_C$>0) and the optical material layer having a negative focal length ($f_L$<0), or b) the caustic layer having a negative focal length ($f_C$<0) and the lens element having a positive focal length ($f_L$>0); and wherein a relationship between the focal length of the optical material layer and the focal length of the caustic layer satisfies following equation:

$$R-\left(\frac{1}{f_L}+\frac{1}{f_C}-\frac{1}{d_s}\right)^{-1}\geq d_R,$$

where:

R is distance between the caustic layer and an eye;

$d_s$ is a distance between the point-like light source and the optical security element; and $d_R$ is a comfortable reading distance from the eye, which is at least 25 cm.

7. The optical security element according to claim 6, marking an object selected from the group comprising: consumer products, value documents, and banknotes.

8. A marked object, selected from a group comprising consumer products, value documents, and banknotes, which comprises the optical security element according to claim 1.

9. A method of visually authenticating an object, marked with the optical security element according to claim 1, by an observer, comprising steps of:

illuminating a light-redirecting surface of the optical security element with a point-like light source at distance $d_s$ from the light-redirecting surface;

visually observing through the optical security element a virtual image of a caustic pattern at distance $d_i$ from the optical security element, with $$d_i = \left|\left(\frac{1}{f_L} + \frac{1}{f_C} - \frac{1}{d_S}\right)^{-1}\right|;$$

and deciding that the object is genuine upon evaluation by the observer that the caustic pattern is visually similar to a reference pattern.

* * * * *